United States Patent [19]

Walters

[11] Patent Number: 4,970,680

[45] Date of Patent: Nov. 13, 1990

[54] COMPUTERIZED BIBLE

[76] Inventor: Jeffrey B. Walters, 591-11th Ave., Paterson, N.J. 07514

[21] Appl. No.: 1,413

[22] Filed: Jan. 8, 1987

[51] Int. Cl.$^5$ .............................................. G06F 15/40
[52] U.S. Cl. .................................. 364/900; 364/943.5; 364/925.4; 364/927.62; 364/928.1; 364/928.2; 364/974
[58] Field of Search ... 364/200 MS File, 900 MS File, 364/400; 350/241, 247, 429

[56] References Cited

U.S. PATENT DOCUMENTS

| | | | |
|---|---|---|---|
| 4,094,598 | 6/1978 | Hodges | 350/241 X |
| 4,111,149 | 9/1978 | Wells | 353/78 |
| 4,445,196 | 4/1984 | Gonet | 364/900 |

*Primary Examiner*—Thomas M. Heckler
*Attorney, Agent, or Firm*—Leon Gilden

[57] ABSTRACT

A portable electronic Bible includes a biblical text storage device, an input address device including a keyboard to facilitate rapid retrieval of selected text electronically stored within the text storage device, and an electrically operated character display screen. Additionally, the computer Bible is provided with illumination so that the display screen can be viewed under poor visibility conditions, while the screen is also adjustable to effect magnification of the displayed text when needed.

1 Claim, 2 Drawing Sheets

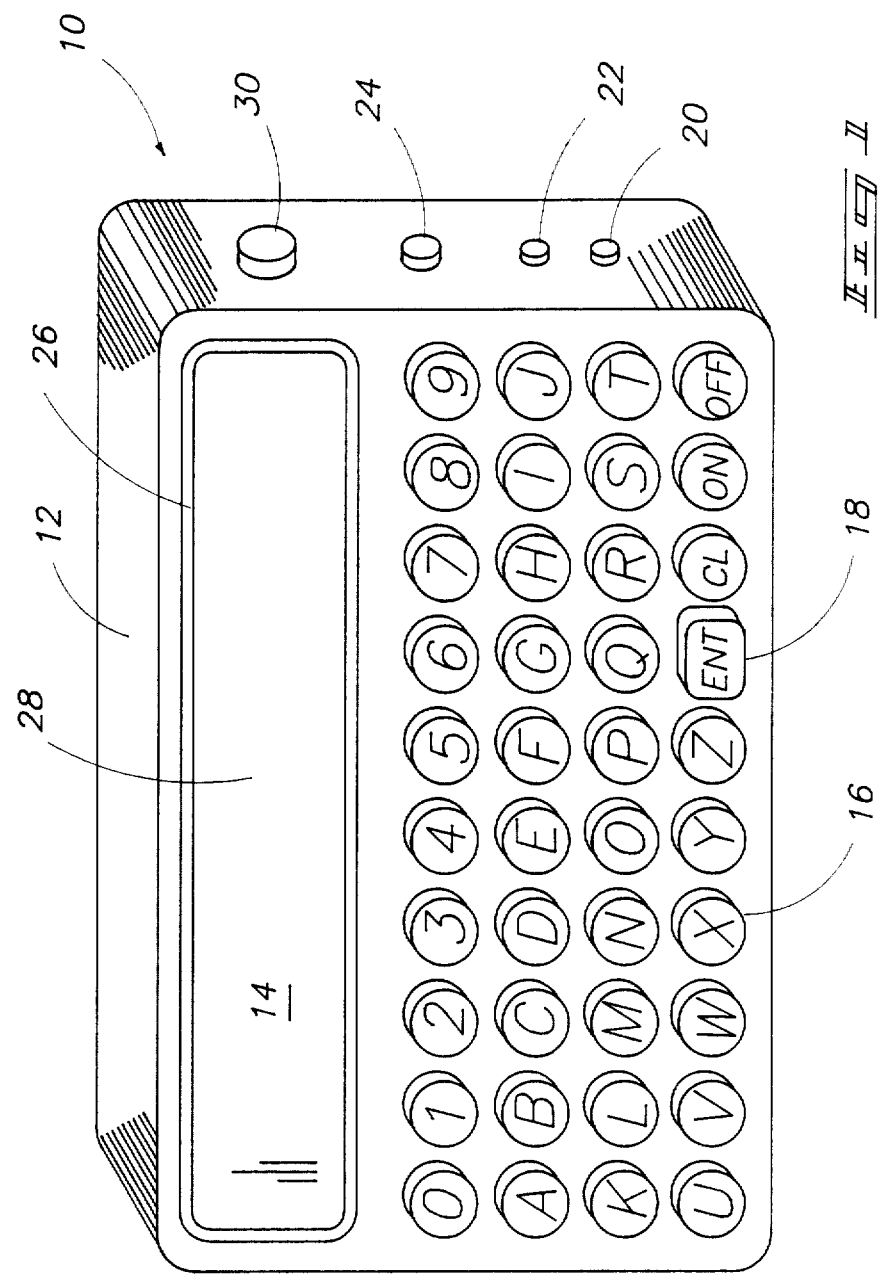

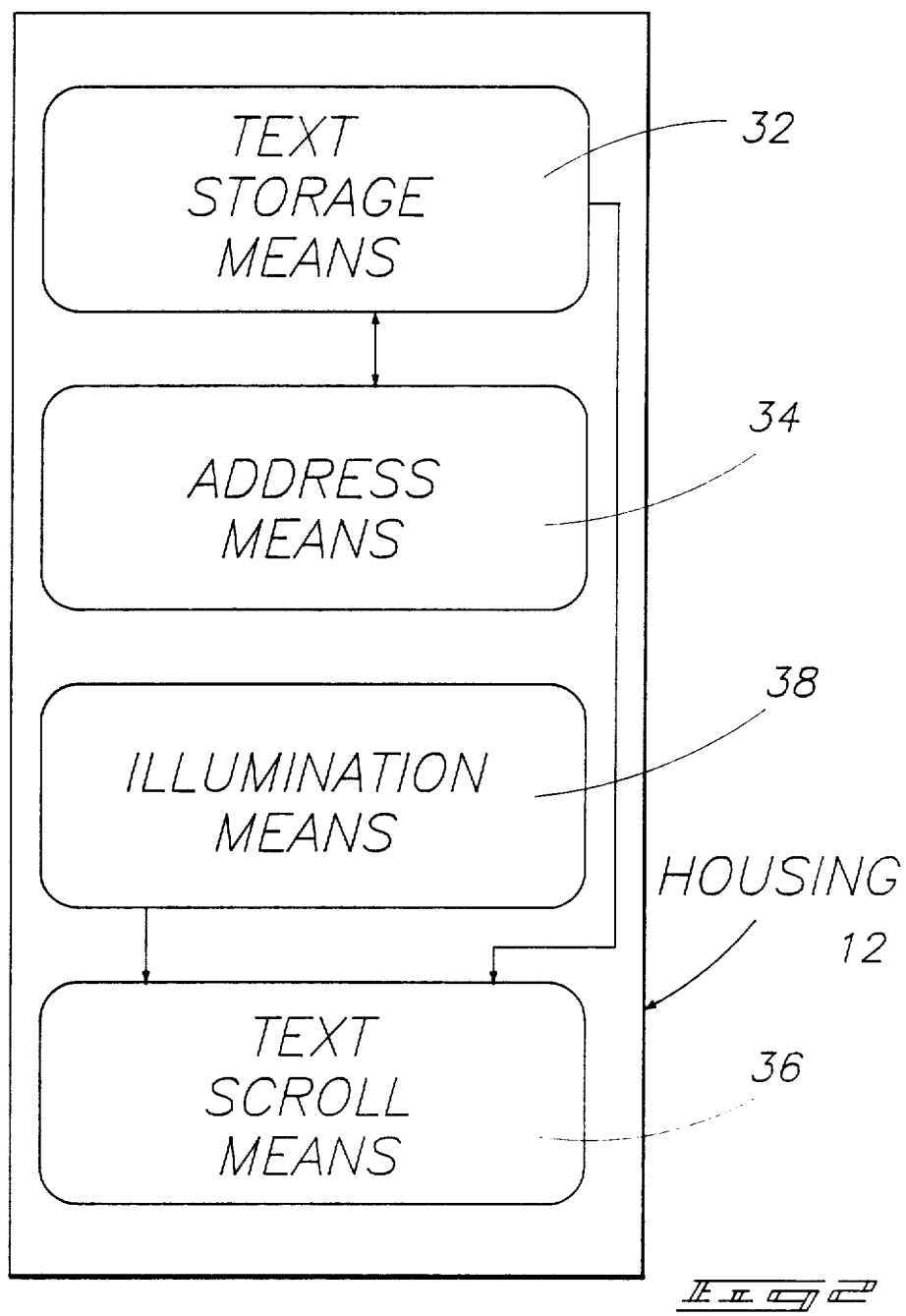

COMPUTERIZED BIBLE

BACKGROUND OF THE INVENTION

1. Field of the Invention

The present invention relates to information retrieval devices, and more particularly pertains to a new and improved hand-held electronic Bible which permits a user to selectively view biblical text.

2. Description of the Prior Art

The use of hand-held electronic information retrieval devices is well known in the prior art. Such devices include electronic dictionaries, electronic calculators, electronic translators, and portable personal information storage and retrieval devices.

A good example of a prior art electronic information retrieval device is to be found in U.S. Pat. 3,781,809, which issued to Murakoshi et al on Dec. 25, 1973. The device illustrated in this patent is designed to retrieve words from a dictionary, and the entire text of a dictionary is stored within the memory portion of a computer.

At least one patent has issued which is relevant to the subject matter of the present invention. In this respect, U.S. Pat. No. 4,445,196, which issued to H. Gonet on Apr. 24, 1984 and the disclosure of which is incorporated herein by reference, discloses an electronic Bible having electronic character display means, biblical text storage means, and input address means for causing selected passages from the Bible to be rapidly displayed during the course of and after the end of a religious gathering. The hand-held computer and associated system is preprogrammed by the leader of the religious gathering by the entering of selected biblical passages into a selected command program store. The selected passages may be thereafter read out in sequence merely by touching a single button during the gathering.

While all of these prior art electronic information storage and retrieval devices are functional for their intended purposes, it can be appreciated that the displayed text of a screen may be difficult for certain individuals to read. In this respect, none of the prior art electronic information storage and retrieval devices make provisions for variations in size of displayed text, so as to accommodate the needs of a reader, and it would appear that there is a continuing need for such modifications to these prior art devices. In this respect, the present invention substantially fulfills this need.

SUMMARY OF THE INVENTION

In view of the foregoing disadvantages inherent in the known types of electronic information storage and retrieval devices now present in the prior art, the present invention provides an improved electronic information storage and retrieval device wherein the same is utilized to store the complete text of the Bible and is further provided with an adjustable display screen which facilitates variations in size of the displayed text. As such, the general purpose of the present invention, which will be described subsequently in greater detail, is to provide a new and improved electronic information storage and retrieval device which has all the advantages of the prior art electronic information storage and retrieval devices and none of the disadvantages.

To attain this, the present invention comprises a portable hand-held electronic information and storage retrieval device which has the complete text of the Bible electronically stored therein. The device includes conventional electronic character display means and input address means for selectively addressing desired portions of the stored text. The keyboard of the computer allows a user to indicate the text portions desired to be viewed and an appropriate depression of the "enter" button will then cause that portion to be displayed on the screen. The computer is also provided with text scroll means whereby a user may move upwardly or downwardly through the text, and is also provided with an internal illumination means to illuminate the character display means during times of poor visibility. Additionally, a rectangularly-shaped convex lens may be selectively moved towards or away from the character display screen so as to magnify or demagnify, as desired, the displayed text. This feature facilitates a use of the device by individuals having poor eye sight.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electronic information storage and retrieval device which has all the advantages of the prior art electronic information storage and retrieval devices and none of the disadvantages.

It is another object of the present invention to provide a new and improved electronic information storage and retrieval device which may be easily and efficiently manufactured and marketed.

It is a further object of the present invention to provide a new and improved electronic information storage and retrieval device which is of a durable and reliable construction.

An even further object of the present invention is to provide a new and improved electronic information storage and retrieval device which is susceptible of a low cost of manufacture with regard to both materials and labor, and which accordingly is then susceptible of low prices of sale to the consuming public, thereby making such electronic information storage and retrieval devices economically available to the buying public.

Still yet another object of the present invention is to provide a new and improved electronic information storage and retrieval device which provides in the apparatuses and methods of the prior art some of the advantages thereof, while simultaneously overcoming some of the disadvantages normally associated therewith.

Still another object of the present invention is to provide a new and improved electronic information storage and retrieval device which provides for the electronic viewing of the complete text of the Bible.

Yet another object of the present invention is to provide a new and improved electronic information storage and retrieval device which allows for variations in size of the displayed text on a character display screen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the electronic Bible comprising the present invention.

FIG. 2 is a block diagram of the operable components of the present invention.

DESCRIPTION OF THE PREFERRED EMBODIMENT

With reference now to the drawings, and in particular to FIG. 1 thereof, a new and improved portable handheld electronic information storage and retrieval device embodying the principles and concepts of the present invention and generally designated by the reference numeral 10 will be described.

More specifically, it will be noted that the electronic Bible 10 includes a conventional housing 12 having an electronic information display screen 14 and keyboard 16. The keyboard 16 includes all of the letters of the alphabet and the numbers 0 to 9. The internal electronic memory is sized to store the complete text of the Bible, with such text being selectively displayed on the character display screen 14 in a conventional manner. In this regard, the user can type in the name of the chapter and verse he desires to view and through an appropriate depression of the "enter" key 18, that portion of the biblical text will be displayed on the screen 14.

Once the beginning of a biblical text section is displayed on the screen 14, a user of the device 10 can depress a first button 20 to scroll downwardly through the text during a reading thereof. If it is desired to move back upwardly through the text or through material previously read, a depression of the scroll button 22 will accomplish this result. During periods of low visibility, such as under conditions of poor lighting, a user can depress the button 24 to activate an internal illumination means. The internal illumination means illuminates the character display screen 14, thereby to facilitate an easier viewing of the text displayed thereon.

FIG. 2 of the drawings illustrates the basic electronic components for functionally operating the invention. In this regard, a text storage means 32 is used to magnetically store the information made available to a user, and an address means 34 is operable to retrieve the information and provide it to a text scroll means 36. The text scroll means provides the information to the display screen 14, while an illumination means 38 is utilized to illuminate the display screen 14. The basic representation of the invention illustration in FIG. 2 is to be taken in combination with the disclosure incorporated by reference from U.S. Pat. No. 4,445,196 as priorly discussed.

As can be appreciated, different users have different reading capability, which could result in the need for some readers to have enlarged text. By the same token, people suffering from poor eyesight can also benefit from a capability to increase the displayed text size, and in this connection, the conventional display screen 14 is recessed within a rectangular opening 26 and is covered by a telescopingly movable rectangularly-shaped convex lens 28. The lens 28 is slidably retained within the recess 26 and may be moved towards or away from the conventional display screen 14 through an appropriate clockwise or counterclockwise rotation of the knob 30. This of course facilitates the magnification or demagnification of displayed text to accommodate the needs of the reader.

With respect to the manner of usage and operation of the present invention, the same should be apparent from the above description. Accordingly, no further discussion regarding the usage and operation of the invention will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved electronic information storage and retrieval device having the complete text of the Bible stored therein, said device including:

biblical text storage means contained within a housing means;

electronic character display means mounted on said housing means;

input address means for causing selected portions of said biblical text to be displayed on said electronic character display means; and illumination means for effecting a selective illumination of said electronic character display means during times of poor visibility, and further including text scroll means operatively associated with said text storage means for directing information derived from said text storage means onto said electronic character display means and permit a reader to move upwardly and downwardly through said biblical text, and further including text magnification means, and wherein said text magnification means includes a convex lens mounted within said housing telescopingly movable towards and away from said electronic character display means.

* * * * *